United States Patent [19]

Felmann et al.

[11] 3,782,471

[45] Jan. 1, 1974

[54] DISPERSING CELLULAR-MICRO-ORGANISMS WITH CHELATING AQUEOUS ALKALINE SURFACTANT SYSTEMS

[75] Inventors: Ted S. Felmann, Phoenix, Ariz.; Hollis B. Carlile, Jr., Hacienda Heights; Charles F. Blankenhorn, La Habra, both of Calif.

[73] Assignee: Shell Oil Company, Houston, Tex.

[22] Filed: Feb. 9, 1972

[21] Appl. No.: 224,932

Related U.S. Application Data

[63] Continuation-in-part of Ser. No. 144,275, May 17, 1971, abandoned.

[52] U.S. Cl. ........ 166/307, 252/8.55 B, 252/8.55 C

[51] Int. Cl. ........ E21b 43/27

[58] Field of Search ........ 166/305 R, 307, 300, 166/311, 312; 252/8.55 B, 8.55 D, 8.55 C

[56] References Cited

UNITED STATES PATENTS

| | | | |
|---|---|---|---|
| 2,777,818 | 1/1957 | Gambill | 252/8.55 B |
| 2,877,848 | 3/1959 | Case | 252/8.55 B X |
| 3,482,635 | 12/1969 | Pasini | 166/305 R |
| 3,528,503 | 9/1970 | Crowe | 166/312 X |
| 3,529,666 | 9/1970 | Crowe | 166/312 X |
| 3,547,194 | 12/1970 | Morine | 166/312 X |
| 3,684,720 | 8/1972 | Richardson | 252/8.55 B X |
| 3,688,829 | 9/1972 | Jones | 166/307 X |
| 3,696,040 | 10/1972 | Mayo | 166/312 X |
| 3,700,031 | 10/1972 | Germer, Jr. et al | 166/305 R X |

*Primary Examiner*—Stephen J. Novosad
*Attorney*—H. W. Coryell et al.

[57] ABSTRACT

A contaminent composed of cellular micro-organism materials is dissolved or dispersed by contacting it with an aqueous solution containing at least one surfactant adapted to disperse the outer wall layers of micro-organism cells, at least one chelating agent adapted to disperse the inner wall layers of micro-organism cells and an alkali metal hydroxide adapted to enhance the dispersing action.

8 Claims, No Drawings

DISPERSING CELLULAR-MICRO-ORGANISMS WITH CHELATING AQUEOUS ALKALINE SURFACTANT SYSTEMS

CROSS-REFERENCE TO RELATED PATENT APPLICATION

The present patent application is a continuation-in-part of application Ser. No. 144,275, filed May 17, 1971 now abandoned.

BACKGROUND OF THE INVENTION

The invention relates to treating wells, or liquids, or structures that contain, or are coated with, cellular micro-organism materials in order to dissolve or otherwise disperse the micro-organism materials. The invention is particularly useful in well treating operations for increasing the permeability of a partially plugged permeable structure, and/or improving the injectivity profile of a reservoir interval containing a plurality of earth formations having different degrees of permeability impairment.

Contaminents comprising cellular micro-organism materials are masses or colonies of cells and/or mixtures of the cells and solid materials such as salts of metals, carbonates, etc., which are produced by or associated with the growth and metabolism of cellular micro-organisms. In the oil industry particularly troublesome cellular micro-organism materials are typified by desulfovibrio desulfurcans, a gram-negative, sulfate-reducing bacteria that tends to grow in or on natural crude oils and associated connate waters. Such contaminents are particularly troublesome in and around water injection wells and/or water treatment facilities. In wells or water treatment facilities water in which the cellular micro-organisms can grow contacts permeable structures, such as permeable earth formations, filter beds, ion exchange resins, well conduits, storage tanks, etc., that tend to become plugged and/or impaired or deteriorated by the contaminents.

Previously proposed chemical systems for destroying or removing cellular micro-organism materials such as those encountered in or around wells often involve the use of strong oxidizing agents, such as hydroperoxides, hypochlorites, etc. which tend to release oxygen and/or to create an oxidizing atmosphere. Such chemical systems and treatments tend to be disadvantageously corrosive with respect to the metal conduits in wells and/or water treatment facilities, or the like.

Conduits, such as tubing strings or other tubular goods in or around a well, the pores in a reservoir formation, the pores in a filter, or the like, are sometimes plugged by a mixture of both cellular micro-organisms and inorganic solids (other than or in addition to those produced by or associated with the metabolism of the micro-organisms). Such inorganic solids commonly include iron oxides or hydroxides (from rust or iron dissolution), alkaline earth metal carbonates, sulfates, or the like (from hard or scaly waters), etc. Such inorganic materials are generally readily dissolved by an acidization or by an ion-exchange type of double decomposition solubilization reaction — if the plugging materials can be contacted by an appropriate reagent. For example, such inorganic solid materials can be dissolved by contacting them with a conventional type of well acidizing solution or by contacting them with a solution of a chelating agent such as a polyamino polycarboxylic acid type of chelating agent that is substantially free of alkali metal hydroxide and is adapted to convert an insoluble inorganic solid such as calcium sulfate to a solution of chelated calcium ions and dissolved sodium sulfate. Such chelating agent solutions are described in U.S. Pat. No. 2,877,848.

In general, the gummy or slimy nature of cellular micro-organism materials causes them to form a coating on inorganic solids and protect the solids from contact with reagent solutions capable of dissolving them. The present invention is useful in pre-treating mixtures of solid inorganic and cellular micro-organism plugging materials to disperse the cellular micro-organism coatings so that the inorganic materials are exposed to the action of an inorganic solid solubilizing reagent such as a solution of an acid or a chelating agent.

SUMMARY OF THE INVENTION

In accordance with this invention, cellular micro-organism materials are dissolved and/or dispersed by contacting them with an aqueous solution containing at least one surfactant effective for dispersing the outer wall layers of micro-organism cells, at least one chelating agent effective for dispersing the inner wall layers of micro-organism cells, and at least an alkali metal hydroxide effective for enhancing said dispersing actions.

The present cellular micro-organism-dispersing, alkaline aqueous solution is particularly effective with respect to gram-negative bacterial materials, such as the sulfate-reducing bacteria. Because of this, the present alkaline aqueous solutions are sometimes referred to as a "bacterial destruct" chemicals or systems or solutions.

DESCRIPTION OF THE INVENTION

The present invention is, at least in part, premised on a discovery that, with respect to a cellular micro-organism (such as a gram-negative bacteria) having cell walls comprising three main layers, such cell walls can feasibly be disintegrated by a non-corrosive and relatively inexpensive alkaline aqueous solution, i.e., the present bacterial destruct chemical. When such a cellular micro-organism is contacted with the bacterial destruct chemical, the outer two cell wall layers (which are essentially fatty material-containing biopolymers of lipoproteins and lipopolysaccharides) appear to be dispersed by the action of the surfactant (which may be a relatively long chain alcohol or alkoxylated alcohol sulfate) and the inner cell wall layer (which is a relatively rigid mucopeptide that resembles chiten, the hard shell of crustaceans or insects), appears to be depolymerized and dispersed by the action of the chelating agent (which may be a polyamino polycarboxylic acid) acting in conjunction with the co-present alkali metal hydroxide and surfactant. When the cell wall layers have been so treated, the inner layers (which are membranes, such as a thin cytoplasmic membrane) appear to be ruptured, probably by osmotic pressure, so that the cellular materials are converted to water soluble and/or dispersible materials (e.g., colloidal macromolecules) that are dissolved or dispersed in the aqueous solution to form a fluid which can flow through relatively small pores of passageways.

The present invention is particularly useful in treating wells which open into a reservoir containing layers or zones of permeable earth formations in which the permeabilities have been damaged or impaired to different degrees due to (1) an accumulation of different amounts of cellular micro-organism plugging materials and/or (2) a relative lack of a removal (e.g. by displacement away from the near well zone) of a residual oil that impedes the permeability to water. In such a reservoir, the bacterial destruct chemical tends to disperse the plugging materials while stripping off relatively impermeable coatings of cellular micro-organism materials that cover other materials (such as a residual oil and/or solid salts inorganic materials, such as carbonates or metal oxides) to expose such materials to the action of solvents, acids, or the like. Such reservoirs are preferably treated by (1) spotting or disposing a slug of the bacterial destruct chemical in contact with the layers of impaired permeability and/or by injecting the bacterial destruct chemical into such layers and (2) subsequently displacing the spent chemical and dissolved or dispersed micro-organism material out of the flow channels by flushing the treated region with a second fluid, such as an inert fluid, a solvent and/or an acid. This causes the overall permeability of the interval to be improved and the profile of permeability with location within the interval to be more uniform. In such treatments, the bacterial destruct chemical disperses the coatings over oil drops or solid salts so that an oil-dissolving solvent or a salt-dissolving acid or the like can penetrate. In addition, the bacterial destruct chemical is in itself a relatively efficient oil-displacing fluid. Where the main plugging component is a residual oil, the oil is displaced as the slug of the bacterial destruct chemical is displaced away from the near well region (e.e. by injecting substantially any fluid, such as water, brine, acid, or the like, behind the bacterial destruct chemical).

Cellular micro-organism materials such as bacterial colonies also tend to grow on or in numerous fluid handling systems, e.g. on the walls of pipelines in or around water treating vessels, tanks, filters, ion exchange resins, and the like. Improvements in the fluid flow properties, i.e., in the effective permeability of fluid handling systems, such as storing or treating systems or the valves or conduits associated with them, can be effected by inflowing the bacterial destruct chemical to contact such cellular micro-organism materials and subsequently displacing the dissolved or dispersed materials that are produced by the action of the bacterial destruct chemical out of the flow paths of channels of the fluid handling systems.

In general, the bacterial destruct system of the present invention is an aqueous solution and/or dispersion containing an effective amount of at least one each of the following: a relatively strong chelating agent having effective chelating and cell wall dispersing properties substantially equivalent to those of an aqueous solution of about 0.1 percent by weight of tetrasodium ethylenediamine tetraacetic acid; an anionic surfactant material having effective interfacial tension lowering and cell wall-dispersing properties equivalent to those of an aqueous solution of about 0.5 percent by weight of NEODOL 25–3S (a polyalkoxylated alcohol sulfate available from Shell Chemical Company) and an effective alkalinity and dispersion enhancing property equivalent to hose of sodium hydroxide. An optimum formulation that exhibited good results in laboratory and field tests comprises a solution containing (in percent by weight of solution) about 0.1 percent tetrasodium ethylenediamine tetraacetate chelating agent, 0.5 percent NEODOL 25–3S surfactant, 1.0 percent NaOH in a substantially fresh water.

The aqueous liquid used in the present bacterial destruct system is preferably at least as pure as a relatively fresh water, but can comprise substantially any relatively soft brine or relatively dilute aqueous solution of neutral electrolytes. In such a water, the concentration of soluble monovalent electrolytes can vary relatively widely, e.g. from trace amounts or less to substantially saturated solutions. Relatively dilute brines containing less than about 5,000 parts per million dissolved monovalent dissolved electrolyte are preferred. The concentration of multivalent electrolytes can vary relatively widely, e.g. from trace amounts or less to substantially saturated solutions. Relatively dilute brines containing less than about 5,000 parts per million dissolved monovalent dissolved electrolyte are preferred. The concentration of multivalent electrolytes such as the calcium magnesium, or barium slats should be generally less than a few hundred parts per million, preferably less than about 200 parts per million. Since the multivalent metal ions are relatively insoluble in an alkaline aqueous solution, the concentration of the chelating agent should be increased to include an amount that will react with polyvalent metal ions to form chelate compounds or soluble complex ions (i.e. the stoichemetric equivalent amount) whenever the solution contains multivalent metal ions.

In a preferred formulation, the present bacterial destruct system comprises an aqueous solution containing about 0.05 to 0.5 percent (by weight of the aqueous liquid) of a fully neutralized alkali metal salt of a polyamino polycarboxylic acid chelating agent (with at least about 0.02 percent being in excess of any amount of chelating agent that reacts with the multivalent ions present in the aqueous solution) from about 0.1 to 1.0 percent by weight of the aqueous liquid of a polyoxyalkylated alcohol sulfate surfactant and about 0.5 to 5 percent by weight of the aqueous liquid of an alkali metal hydroxide.

The components of a bacterial destruct system can be dissolved in the aqueous liquid in substantially any order. The polyamino polycarboxylic acid can be added as the acid or as a partially neutralized acid salt and then neutralized in situ by adding the alkali metal hydroxide. In general, the alkali metal hydroxide is preferably the first component which is added to the aqueous liquid to be used. The aqueous liquid can comprise substantially any available water as long as it has been softened (by substantially any softening procedure, such as ion exchange, flocculation, or the like) to provide a multivalent ion content that, preferably, is equivalent to no more than about 0.48 percent of the aqueous liquid of the chelating agent being used (weighted as the fully neutralized alkali metal salt). Some or all of the components of the present bacterial destruct systems can be dissolved in an aqueous liquid in higher concentrations in order to provide a relatively concentrated solution that is diluted prior to or during its inflow into contact with the cellular micro-organism material to be dispersed or dissolved. The concentration of each or any of the system components can be increased by a significant amount (e.g. to provide up to about 10 percent by weight of the aqueous liquid of a relatively strong chelating agent and/or up to about 10 percent by weight of the aqueous liquid of an effective anionic surfactant, etc.) as long as the relative proportions are kept approximately equivalent to those provided by concentrations within the preferred ranges specified above.

As mentioned above, in a subterranean earth formation, a treatment with the present bacterial destruct system is preferably followed in sequence by an acidization and a flushing out of the dissolved or dispersed materials. In addition, in locations in which water being injected into a well tends to undergo bacterial growth, the benefits of a treatment with the present bacterial destruct system can advantageously be sustained over a relatively long period of time by continuous or periodic treatments of the water being injected with a bactericide such as those described in the M. Legator Pat. No. 2,987,475.

Although various anionic surfactant materials, such as surface active salts of carboxylic and/or sulfonic acids, can be utilized, the preferred surfactants for use in the present invention are the alcohol sulfate surfactants, preferably the predominantly straight chain alcohol and/or polyalkoxylated alcohol sulfates containing from about 12 to 16 carbon atoms. In general, preferred surfactants for use in this invention can be prepared by sulfating surface active alcohols and/or polyalkoxylated surface active alcohols containing from about eight to 20 carbon atoms. The surfactant sulfates of polyethoxylated alcohols are particularly suitable and outstanding test results have been obtained from uses of such ethoxylates of substantially straight-chain aliphatic alcohols. Sulfates of ethoxylated and polyalkoxylated aliphatic alcohols are available from Shell Chemical Company under the trade name of NEODOL. A typical and particularly suitable polyethoxylated alcohol sulfate is NEODOL 25-3S. Other suitable sulfated ethoxylated and polyethoxylated alcohols include those available from Union Carbide under the trade name TERGITOL, such as TERGITOL anionic 14-S-3A. Since the present bacterial destruct chemical is an alkaline aqueous solution, a surfactant such as an alcohol sulfate is dissolved in the form of a soluble salt or is converted to such a salt as it is dissolved.

In general, substantially any relatively strong chelating agent can be used in the present invention. Such materials include polyaminopolycarboxylic acids, alpha-hydroxy acids such as citric, tartaric, gluconic, or the like, the condensed polyphosphates such as the tripoly phosphates, or, meta polyphosphates, or the like. The polyaminopolycarboxylic acids, such as DTPA (Diethylenetriaminepentaacetic acid) and other similar materials such as HEDTA (N-hydroxyethyl-N, N' N; — ethylenediaminetriacetic acid) or the like, are particularly suitable. Especially good results have been obtained with a tetrasodium salt of EDTA (Ethylenediaminetetraacetic acid). The chelating agents, such as the polyaminopolycarboxylic acids, are also dissolved as, or converted to, their salt forms.

The concentration of the alkaline material, chelating agent and surface active material is preferably adjusted relative to the properties of the waters available for formulating the bacterial destruct system and/or the waters or other fluid in or around the earth formation, or other structure to be treated. For example, as discussed above, the amount of the chelating agent should be relatively high where such waters are relatively hard and contain significant proportions of polyvalent metals such as iron, calcium, or the like. Where considerable amounts of residual oil are apt to be encountered, the concentration of the surfactant should be relatively high. Where the concentration of the chelating agent is relatively high, in order to form chelate compounds with multivalent ions, the concentration of alkaline material and neutral salts should be correlated to provide a pH which is greater than about 8 but is not so high that it causes a decomposition of the chelate compounds consisting of the interbonded chelating agents and ions of a metal such as iron.

Example I: Laboratory Test of Bacteria Suspension Dispersion

A series of solutions consisting of bacteria suspensions which had been incubating and growing for several months in the laboratory were tested with various concentrations of sodium hydroxide, NEODOL 25-3S, and $Na_4$ EDTA (tetrasodium ethylenediamine tetraacetate). These solutions were a modified API recommended media containing sodium lactate 4 milliliters (60 percent, yeast extract 1 gm, ascorbic acid 0.1 gm, magnesium sulfate 0.2 gm, dipotassium hydrogen phosphate 0.01 gm, ferrous ammonium sulfate 0.2 gms, sodium chloride 10 gms and 1,000 ml water. The solutions were innoculated with sulfate reducing bacteria Desulfovibrio and allowed to grow for over a month. During this time additional sodium sulfate and lactate and yeast extract were added to provide nutrition for continuous growth of the bacteria. These suspensions of bacteria were used to evaluate the bacteria destroying solution by adding to them the types and amounts of reagents that are indicated in Table 1.

One set of these solutions was kept at room temperature and one at 150°F. The change in the turbidity of these solutions was measured at various times. Typical results and the need for the co-presence of the surfactant chelant and alkali mare shown in Table 1.

TABLE 1

| Percent bacteria suspension neodol 25-3S (percent) | (By weight) $Na_4$EDTA (percent) | Present in as treated NaOH (percent) | Turbidity as percent of initial turbidity of solutions | | | |
|---|---|---|---|---|---|---|
| | | | Contact time, (temperature—72° F.) | | Contact time, (temperature—150° F.) | |
| | | | 8 hours | 24 hours | 8 hours | 24 hours |
| 0.1 | .01 | | 93 | 95 | 105 | 98 |
| .5 | 01 | | 95 | 92 | 98 | 93 |
| 1.0 | 01 | | 94 | 94 | 100 | 97 |
| 0.1 | .05 | | 90 | 87 | 75 | 80 |
| .5 | .05 | | 90 | 84 | 70 | 70 |
| 1.0 | .05 | | 91 | 86 | 69 | 69 |
| 0.1 | .10 | | 89 | 86 | 71 | 66 |
| .5 | .10 | | 88 | 82 | 67 | 64 |
| 1.0 | .10 | | 90 | 81 | 65 | 62 |
| 0.5 | .50 | | 69 | 77 | 62 | 54 |
| 1.0 | .50 | | 75 | 83 | 62 | 54 |
| 5.0 | .50 | | 75 | 83 | 54 | 46 |
| 10.0 | .5 | | 83 | 83 | 67 | 50 |
| 0.5 | 1.00 | | 64 | 79 | 62 | 54 |
| 1.0 | 1.00 | | 77 | 85 | 62 | 54 |
| 5.0 | 1.00 | | 70 | 77 | 62 | 54 |
| 10.0 | 1.00 | | 83 | 83 | 67 | 58 |
| 0.5 | 10.00 | | 100 | 193 | 186 | 121 |
| 1.0 | 10.00 | | 79 | 163 | 86 | 71 |
| 5.0 | 10.00 | | 77 | 85 | 73 | 60 |
| 10.0 | 10.00 | | 81 | 88 | 81 | 63 |
| 0.5 | 0.1 | 0.1 | 78 | 56 | 50 | 0 |
| .5 | .1 | .5 | 38 | 0 | 33 | 0 |
| .5 | .1 | 1.0 | 33 | 0 | 11 | 0 |
| .5 | .1 | 5.0 | 30 | 0 | 0 | 0 |
| 1.0 | .1 | .1 | 73 | 55 | 46 | 0 |
| 1.0 | .1 | .5 | 30 | 0 | 30 | 0 |
| 1.0 | .1 | 1.0 | 30 | 0 | 20 | 0 |
| 1.0 | .1 | 5.0 | 18 | 0 | 20 | 0 |

Example II: Lab Test of Core Permeability Improvement

A chemical system comprising an aqueous solution of 0.1 percent by weight $Na_4$ EDTA, 0.5 percent by weight NEODOL 25-3S and 1.0 percent by weight sodium hydroxide in fresh water was tested in the laboratory.

Tests with Alundum cores (whose brine permeabilities were reduced to 40–50 percent of their original value by flushing them with a bacterial cell suspension so that cellular micro-organism material plugged their pores) indicated 95–100 percent recovery of permeability after cores were treated with the test solution. Similar testing with earth formation cores plugged with bacteria cells yielded a recovery of up to 95 percent of the original permeabilities Tests with Alundum cores plugged by wellhead injection water from a field location showed that treatment with the test solution followed by 15 percent hydrochloric acid (a conventional 15 percent aqueous solution of HCl containing wetting agents and corrosion inhibitors for well acidization use) recovered 70–96 percent of the original permeability, whereas treatment with the acid prior to the test solution or with the acid alone failed to yield any significant recovery.

Example III: Field Test of Reservoir Permeability Improvement

The test well contained a relatively long vertical interval of perforated casing and had once exhibited a water injectivity of about 520 barrels per day at 2,000 psi. Prior to the treatment, the well had been shut down for about 2 years. In preparing for and operating the test, a tubing string equipped with a commercially available Baker EGJ packer was used to circulate the borehole free of suspended particles and was then arranged with the packer set above the perforated interval.

A bacteria destruct chemical system of the Example II formulation was mixed at the well site. The sodium hydroxide was first added to the water and the surfactant and chelating materials were added to the resultant alkaline solution. About 416 pounds of NaOH was mixed into 5,000 gallons of fresh water (about 1 percent by weight of the water) and about 208 pounds NEODOL 25-3S (about 0.5 percent by weight) and about 67.6 pounds of $Na_4$ EDTA (about 0.1 percent by weight plus an additional 0.63 percent to chelate the amount of multivalent ions present in the field available water) were subsequently added.

Before injecting the chemical system, the field available water was injected to establish a steady rate, which was found to be from about 1,510 to 1,540 barrels per day, for 2 consecutive days, with the pressures at from about 1,870 to 1,900 psi.

After establishing the injection rate in the well it was treated with the bacteria destruct chemical system by injecting the fluid down the tubing at 2,000 psi. The fluid remaining in the tubing was displaced to the bottom of the tubing with fresh water. The well was then shut in for 4 hours to soak.

At this point, the well was acidized (by a conventional technique) with a 15 percent aqueous hydrochloric acid containing conventional types and amounts of wetting agents and corrosion inhibitors (i.e., 6 gallons RODINE 220 a corrosion inhibitor available from Amchem Products Inc., 10 pounds citric acid iron chelant, and 2 gallons NEODOL 25-7 a wetting agent polyethoxylated aliphatic alcohol available from Shell Chemical Company per 100 gallons of aqueous HCl). On being returned to water injection within about 14 days, the well established a steady rate of about 2,190 barrels per day at a pressure of about 1,910 psi.

Example IV: Field Test of Injection Profile Improvement

In a similarly conducted field test, using the Example III formulation of bacteria destruct system and subsequent acidization, the following results were obtained. In a well which was initially taking only about 250 to 300 barrels per day at 3,400 psi, the injectivity was increased so much that the well accepted 1,200 barrels per day at only 2,400 psi. In addition, as determined by spinner surveys within the borehole, an initially poor injection profile showing major thief zones was converted to a substantially uniform profile.

Example V: Waterflood Injection Well Treatments

In treatments of nine wells used in a waterflood oil recovery operation, using the Example III formulation and acidization, the average water injection rates were increased by more than 1,000 B/D and the injectivity improved by a factor of 2.5.

Two of the wells that were treated had very poor injection profiles and major thief zones prior to the treatment. The perforations in these two wells were washed with a circulation washer, using about 10 gal/ft of the bacteria destruct chemical, and were then agitated with a casing swab during a 4 hour soak period. Following this a slug of water was injected to displace the bacteria containing solution. Hydrochloric acid was then spotted across the interval and agitated intermittently for 4 hours. Very marked improvements in the injection profile and injection rates of both of these wells resulted from the treatment. The major thief zones disappeared, probably as a result of the lower injection pressure, and zones which had been completely plugged began taking water.

In the remaining seven injectors the injection profiles were satisfactory to begin with, but it was desirable to obtain higher injection rates and lower injection pressures. These wells were given a soak treatment using 10 gal/ft of the bacteria destruct chemical. The solution was pumped into the well to the top of the interval and allowed to soak for 4 hours. The bacteria destroying solution was then displaced by water into the formation and 5 gal/ft of hydrochloric acid was injected to the tap of the interval and allowed to soak for 4 hours. The average rate increase was more than 1,000 B/D and the average injectivity improved by a factor of 2.5. None of the soak wells showed any major change in injection profiles as a result of the treatment.

The advantageous effects of the present invention may at least in part be due to the following. The present aqueous solution combining a surfactant, chelating agent and alkali cause a lysis or disintegration of the bacteria cells and massive colonies in the pores and on the surfaces of the porous material, thus eliminating their plugging action. In addition, by removing the bacteria cells which coat or encapsulate the scale and corrosion products formed from reactions with the bacteria metabolic waste material, such as iron sulfide, the hydrochloric acid is able to contact these acid soluble products and dissolve them.

When acidization is used in conjunction with the present process, the chemicals and techniques can be substantially any of those conventionally used in subterranean earth formations. Such acids can include hydrochloric, sulfuric, nitric, mixtures of hydrochloric and/or sulfuric acids with hydrofluoric acids, i.e., the "mud" acids, or the like, containing the conventional types and amounts of retardants, corrosion inhibitors, and the like.

What is claimed is:

1. A well treating process for dissolving or dispersing cellular micro-organism materials, which process comprises:

contacting subterranean earth formations containing cellular micro-organism materials with an aqueous solution containing at least one surfactant effective for dispersing outer wall layers of micro-organism cells, at least one chelating agent effective for dispersing inner wall layers of micro-organism cells, and at least one alkali metal hydroxide effective for enhancing said dispersing actions; and contacting the so-treated earth formations with a liquid effective for displacing the so-dissolved or dispersed components of micro-organism materials.

2. The process of claim 1 in which said surfactant is an alcohol sulphate surfactant.

3. The process of claim 1 in which said surfactant is an alcohol sulphate surfactant and said chelating agent is a polyaminopolycarboxylic acid.

4. The process of claim 1 in which said aqueous solution contains from about 0.1 to 1.0 percent by weight alcohol sulphate surfactant, from about 0.05 to 0.5 percent by weight of a fully neutralized alkali metal salt of a polyaminocarboxylic acid chelating agent, and an amount of dissolved alkali metal hydroxide having a alkalinity substantially equivalent to that of an aqueous solution of from about 0.5 to 5 percent by weight sodium hydroxide.

5. The process of claim 4 in which said surfactant is a polyethoxylated alcohol sulfate surfactant, said chelating agent is tetrasodium ethylenediaminetetraacetic acid, and said alkaline metal hydroxide is sodium hydroxide.

6. The process of claim 1 in which the injection of said aqueous solution is followed by an injection of sufficient water-miscible liquid to displace said aqueous solution away from the location in which said cellular micro-organism material was initially disposed.

7. The process of claim 6 in which said displacing fluid includes an acidizing fluid.

8. A process for improving the injectivity profile of an interval of permeable earth formations having different degrees of permeability impairment, comprising:

pumping into the well an aqueous solution containing at least one surfactant effective for dispersing the outer wall layer or micro-organism cell, at least one chelating agent effective for dispersing the inner wall layers of micro-organism cells, and at least one alkali metal hydroxide effective for enhanicng said dispersing actions, with said solution being pumped into the well so that it is disposed in contact with said interval of permeable earth formations; and subsequently effecting a fluid displacement of said aqueous solution and the resultant solution or dispersion of components of said cellular micro-organism material away from the immediate vicinity of the junction between the earth formations and the well.

* * *